US010531477B2

(12) United States Patent
Guo et al.

(10) Patent No.: US 10,531,477 B2
(45) Date of Patent: Jan. 7, 2020

(54) INTERFERENCE FREE SCHEDULING FOR MULTI-CONTROLLER MULTI-CONTROL-LOOP CONTROL SYSTEMS OVER WIRELESS COMMUNICATION NETWORKS

(71) Applicant: Mitsubishi Electric Research Laboratories, Inc., Cambridge, MA (US)

(72) Inventors: Jianlin Guo, Newton, MA (US); Philip Orlik, Cambridge, MA (US); Yebin Wang, Acton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 8 days.

(21) Appl. No.: 15/474,141

(22) Filed: Mar. 30, 2017

(65) Prior Publication Data

US 2018/0288785 A1    Oct. 4, 2018

(51) Int. Cl.
*H04W 72/12* (2009.01)
*H04L 12/24* (2006.01)
(Continued)

(52) U.S. Cl.
CPC ......... *H04W 72/1242* (2013.01); *H04L 41/12* (2013.01); *H04W 28/16* (2013.01);
(Continued)

(58) Field of Classification Search
None
See application file for complete search history.

(56) References Cited

U.S. PATENT DOCUMENTS 6,628,661 B1 * 9/2003 Goldman ............... H04L 45/02
370/408
7,830,834 B2  11/2010 Das et al.
(Continued)

OTHER PUBLICATIONS

Begum et al., Composite Interference Mapping Model for Interference Fault Free Transmission in WSN, 2015 International Conference on Advances in Computing, Communications and Informatics, IEEE Aug. 10, 2015, pp. 2118-2125.
(Continued)

*Primary Examiner* — Jason E Mattis
*Assistant Examiner* — Bao G Nguyen
(74) *Attorney, Agent, or Firm* — Gennadiy Vinokur; Hironori Tsukamoto; James McAleenan

(57) ABSTRACT

Devices and methods for determining a schedule of unicast transmissions between wireless transceivers using a principal controller. A receiver receives information of a set of transmissions between the transceivers for a period of time, a priority of each transmission, and a topology of a network of transceivers, i.e. neighborhood nodes having controllers and devices. A processor sequentially partitions the transmissions based on priority and the topology of the network, groups of concurrent transmissions that do not interfere with each other, beginning with a highest priority group, and ending, with a lowest ending priority group. Apply a predetermined optimization assignment, comparing all transactions according to the priority optimization assignment, to determine a prioritized order of transmission for each transmission in each group. Assign each transmission a respective time slot within a sequence of time slots of the time period via priority optimization assignment order of transmissions, to obtain the transmission schedule.

20 Claims, 9 Drawing Sheets

(51) Int. Cl.
   *H04W 28/16* (2009.01)
   *H04W 72/04* (2009.01)
   *H04W 72/08* (2009.01)
   *H04W 84/18* (2009.01)
   *H04L 29/08* (2006.01)

(52) U.S. Cl.
   CPC ........... *H04L 67/12* (2013.01); *H04W 72/042* (2013.01); *H04W 72/082* (2013.01); *H04W 84/18* (2013.01)

(56) References Cited

U.S. PATENT DOCUMENTS

| | | | | |
|---|---|---|---|---|
| 2005/0251722 | A1* | 11/2005 | Terry | H04L 1/1812 714/749 |
| 2008/0019373 | A1* | 1/2008 | Filipovich | H04W 72/1242 370/395.4 |
| 2008/0049672 | A1 | 2/2008 | Barak et al. | |
| 2008/0274746 | A1* | 11/2008 | Lin | H04B 7/2606 455/449 |
| 2011/0141959 | A1* | 6/2011 | Damnjanovic | H04L 1/1854 370/311 |
| 2011/0200019 | A1* | 8/2011 | Manbo | H04W 72/048 370/336 |
| 2013/0070648 | A1* | 3/2013 | Kubo | H04W 72/1257 370/256 |
| 2014/0254415 | A1* | 9/2014 | Chen | H04L 27/0006 370/252 |
| 2016/0212758 | A1* | 7/2016 | Leung | G06Q 10/00 |
| 2018/0288785 | A1* | 10/2018 | Guo | H04L 41/12 |

OTHER PUBLICATIONS

Saifullah et al., "End to End Delay Analysis for Fixed Priority Scheduling in Wireless HART Networks," Real time and Embedded Technology and Applications Symposium, 2011 17th IEEE. Apr. 11, 2011, pp. 13-22.

Peters, E. G. W., Quevedo, D. E. and Fu, M. "Controller and scheduler codesign for feedback control over IEEE 802.15.4 networks". IEEE Transactions on Control Systems Technology, 24(6):2016-2030 2016.

* cited by examiner

INTERFERENCE FREE SCHEDULING FOR MULTI-CONTROLLER MULTI-CONTROL-LOOP CONTROL SYSTEMS OVER WIRELESS COMMUNICATION NETWORKS

FIELD

The present disclosure relates to devices and methods for interference free scheduling for wireless control systems, and particularly to scheduling of concurrent packet transmissions in wireless control system that optimizes interference free or collision-free concurrent transmissions.

BACKGROUND

The recent adoption of wireless networks in industrial environment has significantly accelerated the development of networked control, in which, the network system and control system work cooperatively to achieve the best performance control. The network system provides real-time data delivery to the control system to make the best control decision. The control system feedbacks its control requirements to the network system to delivery data based on control priority. The network system must delivery data based on criteria that benefit control system the most. However, due to such an increase in wireless networks, the frequencies used for transmission become crowded, and cause significant problems, such as collision and interference of concurrent transmissions.

For example, in an industrial environment, there can be hundreds of production equipment controlled by many different controllers. Wherein, each controller is designed to control certain types of equipment, this combination or pair, forms a control loop. The controller controls the operations of the equipment via a network system and the equipment provides feedback status and measurements back to the controller, through a same or an alternative network system. The controller can directly communicate with multiple equipment, or on the other hand, the equipment can also directly communicate with multiple controllers. However, problems occur when these controllers cooperatively schedule control packet and status packet transmission for whole system to minimize packet latency and to maximize system throughput. For example, throughput becomes a significant issue, among many issues, one such issue includes collision/interference of concurrent transmissions resulting in long delays. These long delays are simply inacceptable in the industrial control system environment.

Another example, is in a cellular environment. A base station communicates with multiple mobile devices, or on the other hand, a mobile device can be within communication of multiple base stations. However, like the above noted industrial environment example, problems in the cellular environment also occur when base stations cooperatively schedule downlink and uplink data transmission to achieve a system level optimization. For example, throughput becomes a significant issue, among many issues, including collision/interference of concurrent transmissions that also result in long delays. These long delays are also simply inacceptable in the cellular environment.

Regarding U.S. Pat. No. 7,830,834 B2, the wireless communication network includes a network coordinator assigning time slots and channels to nodes to provide collision-free scheduling. Each node sends the status information to network coordinator in TDMA mode. However, only one node can transmit packet at a given time slot. Concurrent transmissions can only take place on different frequency channels.

Accordingly, there is a need for devices and methods to provide scheduling technologies for industrial control systems, or other control systems, so as to maximize interference free (collision-free) concurrent transmissions.

SUMMARY

Embodiments of the present disclosure provide for devices and methods for interference free scheduling for wireless control systems, and particularly to scheduling of concurrent packet transmissions in wireless control systems that optimizes interference free (collision-free) concurrent transmissions.

Specifically, the present disclosure is based on a recognition that conventional scheduling does not allow concurrent transmissions on a wireless channel of a wireless communication network. Due to the increased adoption of wireless networks in industrial environments there has been an accelerated development of networked controls, in which, the network and control systems work cooperatively. For example, in an industrial environment, there can be hundreds of production equipment that are controlled by many different controllers, such that each controller can be designed to control certain types of equipment. However, there are problems with this increased use of wireless networks in industrial environments, or similar type environments with an increased use of wireless networks, that is collision/interference of concurrent transmissions.

Accordingly, aspects of the present disclosure look to provide scheduling technologies for industrial control systems, so as to optimize interference free (collision-free) concurrent transmissions. Further, aspects of the present disclosure provide for data anonymization devices and methods that minimize or avoid the usage of the actual state of the device producing the data.

For example, while experimenting to solve this problem, we began looking at the traditional construct of wireless networks in environments, in which the network and control systems work cooperatively, specifically, networks with a single transmission in an allocated time slot. However, we discovered that these types of constructs or variations thereof, resulted in long delays which were inacceptable in today's industrial control systems or other types of control systems.

Further, we discovered when trying to use a contention access period approach with a time division multiple access (TDMA) method, we learned of other problems. For example, we found these problems included: (1) a time slot was scheduled to only one node; (2) there is only one controller; and (3) priority wasn't considered. Thus, did not consider these types of constructs for further experimentation.

We realized that in an industrial environment, or for any environment, each transmission is a unicast transmission between a controller to a machine. For each unicast transmission it is possible separate important from unimportant collisions. Specifically, for each unicast transmission, it is possible to determine concurrent unicast transmissions that do not collide with the unicast transmission. Wherein each transmission has priority. The schedule can be determined in an order of priorities, while optimizing the sum of the priorities of concurrent transmissions scheduled within each period of time.

We further realized at least one solution, among many solutions, included determining a schedule for concurrent and subsequent transmissions within the period of time according to an order of the priority of the transmission while maximizing a sum of the priorities of concurrent transmissions scheduled within the period of time.

Through the course of solving this problem, we learned multiple nodes in a wireless communication network can be scheduled to transmit packets concurrently without causing interference. To select nodes that transmit concurrently at a time slot, the maximum number of nodes with the highest priority packets can be first selected, then the maximum number of nodes with the second highest priority packets are added, this process continues until no node can be added or no node left. The selected group of nodes can transmit packets simultaneously without causing interference.

For example, some embodiments of the present disclosure divide nodes into concurrent transmission groups. The first group is scheduled to transmit at the first time slot of a schedule, the second groups is scheduled to transmit at the second time slot of a schedule, . . . , and the last group is scheduled to transmit at the last time slot of a schedule.

Other embodiments of the present disclosure may assign a time slot to multiple nodes by controllers cooperatively. A principle/master controller can collect information such as packet priority, packet destination and network topology from all controllers, stationary machines, mobile robots, and then makes TDMA schedule. A schedule is contained in a scheduling packet and broadcasted simultaneously by all controllers to all stationary machines and/or mobile robots. A stationary machine or mobile robot computes time slot starting time and time slot ending time using its local clock.

To better explain our realizations, and provide at least an example of the present disclosure, by non-limiting example, we use a principal or master controller for determining a schedule of unicast transmissions between wireless transceivers. The principal controller can include a receiver that receives information indicative of a set of transmissions between the wireless transceivers for a period of time, a priority of each transmission, and a topology of a network of wireless transceivers. The network defines neighborhood nodes, such that the neighborhood nodes include controllers and devices (stationary machines and/or mobile robots).

A processor can sequentially partition, from the received transmissions based on the priorities and the topology of the network, groups of concurrent transmissions that do not interfere with each other, beginning with a highest priority group, and ending, with a lowest ending priority group. Wherein, for each group, the processor can apply a predetermined priority optimization assignment.

For example, a user input provided on a surface of a user input interface in communication with the processor, can be received and stored in the memory by the processor, wherein the user input can relate to one of the predetermined priority optimization assignments stored in memory.

For example, one predetermined priority optimization assignment can be based on priority optimizing, that compares all transactions in all the groups according to the priority optimization assignment, to determine a prioritized order of transmission for each transmission in each group for the set of transmissions. Then, assigns each transmission of the set of transmissions a respective time slot within a sequence of time slots of the time period according to the priority optimization assignment order of transmissions, to obtain the transmission schedule, starting with a highest transmission priority at a first time slot to lowest ending transmission priority at a last time slot in the sequence of time slots of the time period. Finally, the processor can propagate the transmission schedule to controllers, so transmitters of the controllers can then broadcast the transmission schedule out to network.

Specifically, the predetermined priority optimization assignment can determine the prioritized order of transmission for each transmission in each group for the set of transmissions, based on, the step of determining a number of transmissions for each group of transmissions. Then, assign each group of transmissions of the groups of transmissions sequentially, according to a largest number of transmissions to a smallest number of transmissions. By assigning the group of transmissions having the largest number of transmissions to the first time slot in the sequence of time slots, and ending the sequential assignment, and by assigning the group of transmissions having the smallest number of transmissions to the last time slot in the sequence of time slots of the time period.

It is contemplated that other predetermined priority optimization assignments stored in memory may be used, which are disclosed in detail later.

According to an embodiment of the present disclosure, a principal controller for determining a schedule of transmissions between wireless transceivers. The principal controller including a receiver to receive information indicative of a set of transmissions between the wireless transceivers for a period of time, a priority of each transmission, and a topology of a network of wireless transceivers. The network defining neighborhood nodes for a time period, such that the neighborhood nodes include a set of controllers and a plurality of devices, such that each transmission is a unicast transmission. A processor to sequentially partition, from the set of transmissions based on the priorities of transmissions and the topology of the network, groups of concurrent transmissions that do not interfere with each other, beginning with a highest priority group, and ending the sequential partition, with a lowest ending priority group. Wherein, for each group, the processor applies a predetermined priority optimization assignment. The predetermined priority optimization assignment is based on the priority optimizing, compares all transactions in all the groups according to the priority optimization assignment, to determine a prioritized order of transmission for each transmission in each group for the set of transmissions. Assigns each transmission of the set of transmissions a respective time slot within a sequence of time slots of the time period according to the priority optimization assignment order of transmissions, to obtain the transmission schedule, starting with a highest transmission priority at a first time slot to lowest ending transmission priority at a last time slot in the sequence of time slots of the time period. Further, Propagate the transmission schedule to controllers of the set of controllers. Wherein transmitters of the controllers then broadcast the transmission schedule to network.

According to an embodiment of the present disclosure, a principle controller for determining a schedule of transmissions between wireless transceivers. Having a receiver to receive information indicative of a set of transmissions between the wireless transceivers for a period of time, a priority of each transmission, and a topology of a network of wireless transceivers, the network defining neighborhood nodes for a time period. Such that the neighborhood nodes include a set of controllers and a plurality of devices, wherein each transmission is a unicast transmission. The principle controller includes a memory. A processor in communication with the memory to sequentially partition, from the set of transmissions based on the priorities of transmissions and the topology of the network, groups of concurrent transmissions that do not interfere with each other, beginning with a highest priority group, and ending the sequential partition, with a lowest ending priority group. Wherein, the processor applies a predetermined priority optimization assignment for each group, and based on the priority optimizing, compares all transactions in all the groups according to the priority optimization assignment, to determine a prioritized order of transmission for each transmission for the set of transmissions. Assign each transmission of the set of transmissions a respective time slot within a sequence of time slots of the time period according to the priority optimization assignment order of transmissions, to obtain the transmission schedule, starting with a highest transmission priority at a first time slot to lowest ending transmission priority at a last time slot in the sequence of time slots of the time period. Propagate the transmission schedule to controllers of the set of controllers, and transmitters of the controllers then broadcast the transmission schedule to network.

According to another embodiment of the present disclosure, a method for determining a schedule of transmissions between wireless transceivers that uses a principle controller in communication with the wireless transceivers. Wherein receiver receives information indicative of a set of transmissions between the wireless transceivers for a period of time, a priority of each transmission, and a topology of a network of wireless transceivers. The network defines neighborhood nodes for a time period, and includes a set of controllers and a plurality of devices. The method including, sequentially partitioning, by a processor, from the set of transmissions based on the priorities of transmissions and the topology of the network, groups of concurrent transmissions that do not interfere with each other, beginning with a highest priority group, and ending the sequential partitioning, with a lowest ending priority group. Applying, by the processor, to each group, a predetermined priority optimization assignment stored in a memory in communication with the processor, and based on the priority optimizing of each group, comparing all transactions in all the groups according to the priority optimization assignment, to determine a prioritized order of transmission for each transmission for the set of transmissions. Assigning, by the processor, to each transmission in each group of the set of transmissions, a respective time slot within a sequence of time slots of the time period according to the priority optimization assignment order of transmissions, to obtain the transmission schedule, starting with a highest transmission priority at a first time slot to lowest ending transmission priority at a last time slot in the sequence of time slots of the time period. Propagating the transmission schedule to controllers of the set of controllers, and broadcasting the transmission schedule to network using transmitters of the controllers.

Further features and advantages will become more readily apparent from the following detailed description when taken in conjunction with the accompanying drawings.

DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

Figure 1A:
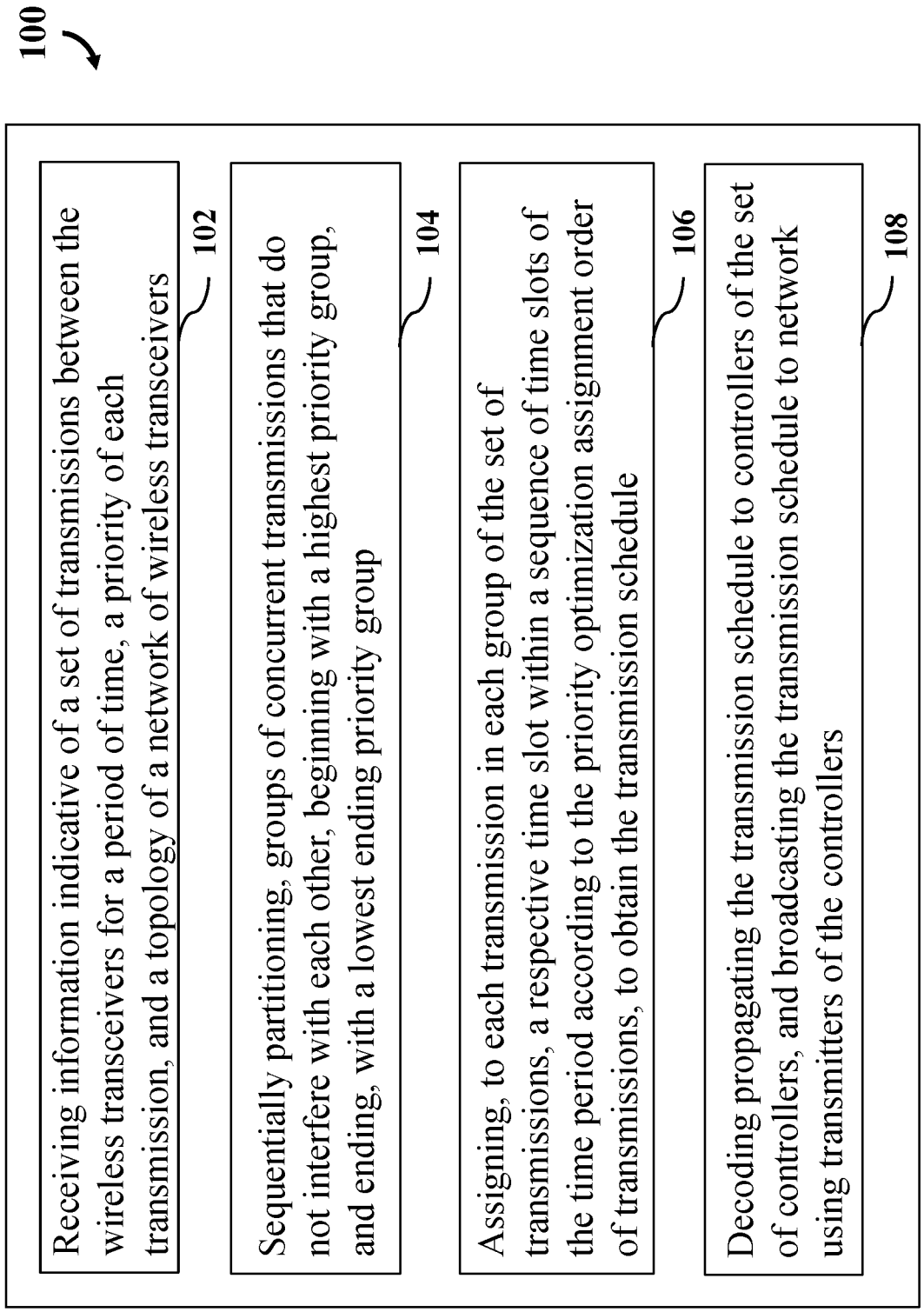
FIG. 1A is a block diagram illustrating at least one set of methods steps, according to embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

Embodiments of the present disclosure provide for devices and methods for interference free scheduling for wireless control systems, and particularly to scheduling of concurrent packet transmissions in wireless control systems that optimizes interference free (collision-free) concurrent transmissions.

In particular, the present disclosure is based on a recognition that conventional scheduling does not allow concurrent transmissions on a wireless channel of a wireless communication network. Because of the increased use of wireless networks in industrial environments, or other environments, there are networked controls, in which, the network and control systems work cooperatively. For example, in an industrial environment, hundreds of production equipment can be controlled by many different controllers, such that each controller can be designed to control certain types of equipment. However, problems occur from this increased use of wireless networks in industrial environments, such as collision/interference of concurrent transmissions.

While experimenting to solve this problem, we began experimenting with the traditional construct of wireless networks, in which the network and control systems work cooperatively, specifically, networks with a single transmission in an allocated time slot. However, we discovered that these types of constructs or variations thereof, resulted in long delays which is inacceptable in industrial control systems or other types of control systems.

Further, we discovered when trying to use a contention access period approach with a time division multiple access (TDMA) method, we learned of other problems. For example, we found these problems included: (1) a time slot was scheduled to only one node; (2) there is only one controller; and (3) priority wasn't considered. Thus, did not consider these types of constructs for further experimentation.

We realized in an industrial environment, each transmission is a unicast transmission between a controller to a machine. Wherein for each unicast transmission it is possible to separate important from unimportant collisions. Specifically, for each unicast transmission, it is possible to determine concurrent unicast transmissions that do not collide with the unicast transmission, and that each transmission can have a priority. The schedule can be determined in an order of priorities while maximizing the sum of the priorities of concurrent transmissions scheduled within each period of time.

We further realized at least one solution, among many solutions, included determining a schedule for concurrent and subsequent transmissions within the period of time according to an order of the priority of the transmission while maximizing a sum of the priorities of concurrent transmissions scheduled within the period of time. Through the course of solving this problem, we learned multiple nodes in a wireless communication network can be scheduled to transmit packets concurrently without causing interference. To select nodes that transmit concurrently at a time slot, the maximum number of nodes with the highest priority packets can be first selected, then the maximum number of nodes with the second highest priority packets are added, this process continues until no node can be added or no node left. The selected group of nodes can transmit packets simultaneously without causing interference.

For example, some embodiments of the present disclosure divide nodes into concurrent transmission groups. The first group is scheduled to transmit at the first time slot of a schedule, the second groups is scheduled to transmit at the second time slot of a schedule, . . . , and the last group is scheduled to transmit at the last time slot of a schedule.

Other embodiments of the present disclosure may assign a time slot to multiple nodes by controllers cooperatively. A principle controller can collect information such as packet priority, packet destination and network topology from all controllers and then makes TDMA schedule. A schedule is contained in a scheduling packet and broadcasted simultaneously by all controllers to all stationary machines and/or mobile robots. A stationary machine or mobile robot computes time slot starting time and time slot ending time using its local clock.

To better explain our realizations, and provide at least an example of the present disclosure, by non-limiting example, we use a principal or master controller for determining a schedule of unicast transmissions between wireless transceivers. The principal controller can include a receiver that receives information indicative of a set of transmissions between the wireless transceivers for a period of time, a priority of each transmission, and a topology of a network of wireless transceivers. The network defines neighborhood nodes, such that the neighborhood nodes include controllers and devices. A processor can sequentially partition, from the received transmissions based on the priorities and the topology of the network, groups of concurrent transmissions that do not interfere with each other, beginning with a highest priority group, and ending, with a lowest ending priority group. Wherein, for each group, the processor can apply a predetermined priority optimization assignment.

For example, a user input provided on a surface of a user input interface in communication with the processor, can be received and stored in the memory by the processor, wherein the user input can relate to one of the predetermined priority optimization assignments stored in memory. In particular, one predetermined priority optimization assignment can be based on priority optimizing, that compares all transactions in all the groups according to the priority optimization assignment, to determine a prioritized order of transmission for each transmission in each group for the set of transmissions. Then, assigns each transmission of the set of transmissions a respective time slot within a sequence of time slots of the time period according to the priority optimization assignment order of transmissions, to obtain the transmission schedule, starting with a highest transmission priority at a first time slot to lowest ending transmission priority at a last time slot in the sequence of time slots of the time period. Finally, the processor can propagate the transmission schedule to controllers, so transmitters of the controllers can then broadcast the transmission schedule out to network.

Specifically, the predetermined priority optimization assignment can determine the prioritized order of transmission for each transmission in each group for the set of transmissions, based on, the step of determining a number of transmissions for each group of transmissions. Then, assign each group of transmissions of the groups of transmissions sequentially, according to a largest number of transmissions to a smallest number of transmissions. By assigning the group of transmissions having the largest number of transmissions to the first time slot in the sequence of time slots, and ending the sequential assignment, and by assigning the group of transmissions having the smallest number of transmissions to the last time slot in the sequence of time slots of the time period.

FIG. 1A is a block diagram of a method according to the present disclosure. For example, method 100 is for determining a schedule of transmissions between wireless transceivers that uses a principle controller in communication with the wireless transceivers.

Step 102 of method 100 uses a receiver to receive information indicative of a set of transmissions between the wireless transceivers for a period of time, a priority of each transmission, and a topology of a network of wireless transceivers. The network defining neighborhood nodes for a time period. Such that the neighborhood nodes include a set of controllers and a plurality of devices, wherein each transmission is a unicast transmission.

Step 104 of FIG. 1A includes sequentially partitioning, by a processor, from the set of transmissions based on the priorities of transmissions and the topology of the network, groups of concurrent transmissions that do not interfere with each other, beginning with a highest priority group, and ending the sequential partitioning, with a lowest ending priority group.

Step 106 of FIG. 1A includes applying, by the processor, to each group, a predetermined priority optimization assignment stored in a memory in communication with the processor, and based on the priority optimizing of each group, comparing all transactions in all the groups according to the priority optimization assignment, to determine a prioritized order of transmission for each transmission for the set of transmissions.

Step 106 of FIG. 1A includes assigning, by the processor, to each transmission in each group of the set of transmissions, a respective time slot within a sequence of time slots of the time period according to the priority optimization assignment order of transmissions, to obtain the transmission schedule, starting with a highest transmission priority at a first time slot to lowest ending transmission priority at a last time slot in the sequence of time slots of the time period.

Step 108 of FIG. 1A includes propagating the transmission schedule to controllers of the set of controllers, and broadcasting the transmission schedule to network using transmitters of the controllers.

Figure 1B:
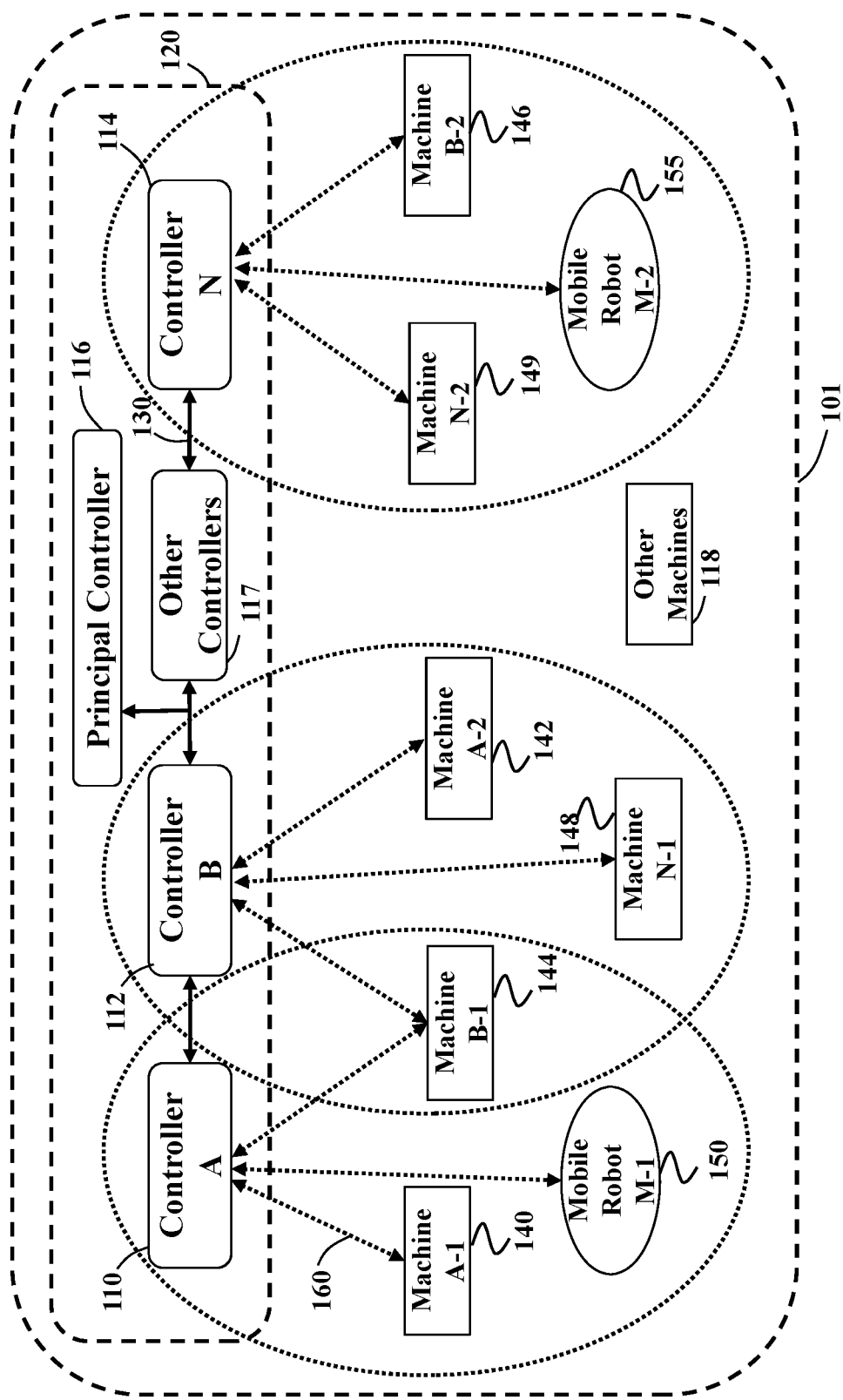
FIG. 1B is a block diagram illustrating a multi-controller control system over hybrid communication networks, according to embodiments of the present disclosure.

FIG. 1B is a block diagram illustrating a multi-controller control system over hybrid communication networks, according to embodiments of the present disclosure. Specifically, FIG. 1B shows a schematic of the multi-controller control system 101 over wireless communication network according to embodiments of the present disclosure. The control system 101 consists of three types of nodes: controller, stationary machine and mobile robot. There are N controllers, controller A 110, controller B 112, . . . , controller N 114. These controllers form a controller network 120 via a reliable communication link 130, which can be wired or wireless. In industrial system, reliable network 120 can be an Industrial Ethernet (IE) network and in cellular system, reliable network 120 can be backbone network. Each controller controls certain types of machines and mobile robots. It is possible to have other controllers 117 and other machines 118 within the network.

For example, controller A controls machine A-1 140, machine A-2 142 and mobile robot M-1 150; controller B controls machine B-1 144 and machine B-2 146; and controller N controls machine N-1 148, machine N-2 149 and mobile robot M-2 155. Controller 116 acts as principal (master) controller to make schedule for system 101. The controllers communicate with machines and mobile robots via a wireless communication link 160, which can be same or different from reliable communication link 130. Each stationary machine or mobile robot can directly communicate with at least one controller via communication link 160.

Referring to FIG. 1B, however, a controller may not be able to directly communicate with its controlled machines. For example, controller A controls machine A-2, which cannot directly communicate with controller A. Instead, machine A-2 can directly communicate with controller B only. Therefore, controller B needs to relay packets between controller A and machine A-2 via reliable communication link 130. As a result, controller network 120 must relay packets to destinations via reliable communication link 130. Mobile robots are controlled by controllers cooperatively. It is noted that in a wireless network, only interference that affects destination node to receive packet should be avoided.

Figure 2A:
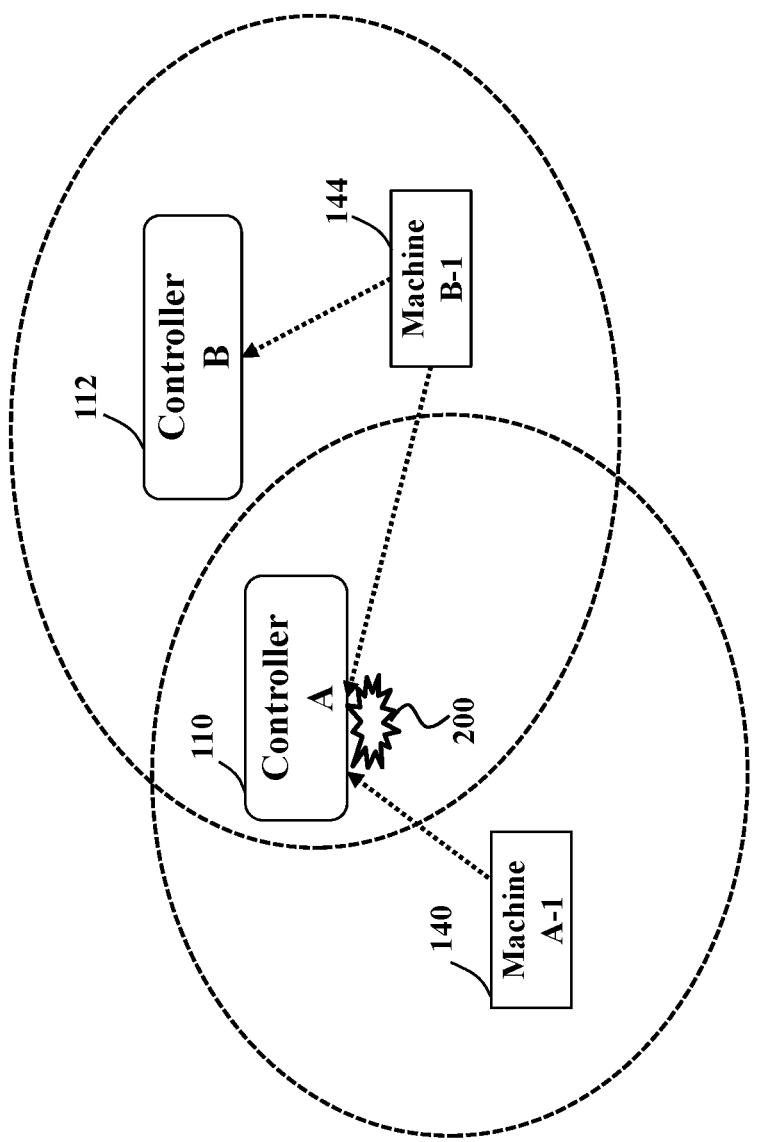
FIG. 2A is a schematic illustrating an example of interference that causes collision at a destination node, according to embodiments of the present disclosure.

FIG. 2A is a schematic illustrating an example of interference that causes collision at a destination node, according to embodiments of the present disclosure. In FIG. 2A, machine A-1 140 is transmitting packet to controller A 110 and machine B-1 144 is also transmitting packet to controller B 112. Since controller A is also in transmission range of machine B-1, the transmission of machine B-1 interferes with controller A's packet receiving sent by machine A-1. As a result, the packet collision 200 occurs at controller A and controller A cannot correctly receive packet from machine A-1. Therefore, this type of interference must be eliminated.

Figure 2B:
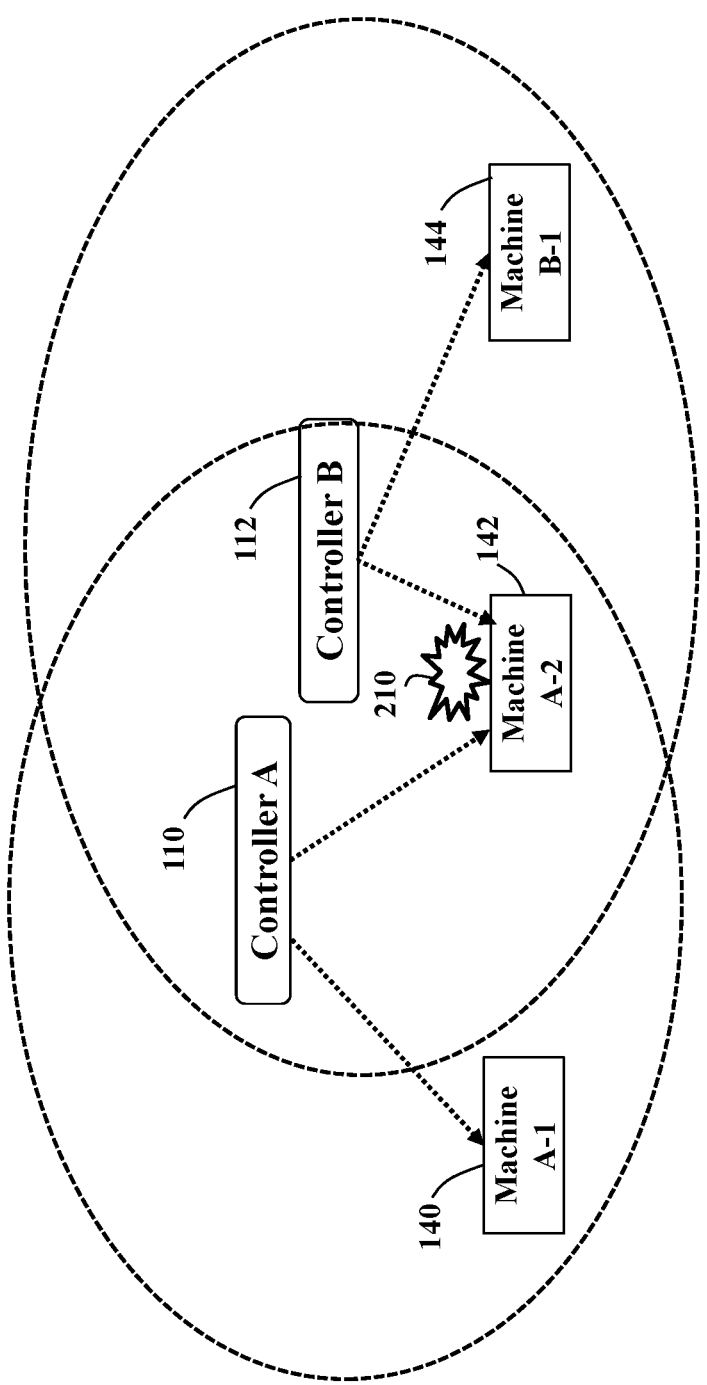
FIG. 2B is a schematic illustrating an example of the interference that does not cause the collision at the destination node, according to embodiments of the present disclosure.

FIG. 2B is a schematic illustrating an example of the interference that does not cause the collision at the destination node, according to embodiments of the present disclosure. Specifically, FIG. 2B shows controller A transmitting packet to machine A-1 and controller B is also transmitting packet to machine B-1. Packet collision 210 occurs at machine A-2. However, since both packets are not destined to machine A-2, the collision 210 does not cause any issue. Therefore, it is not necessary to avoid this type of interference. For example, at least one aspect to be most efficient, among many aspects, a scheduler needs to schedule as many as possible nodes to transmit packets as long as these concurrent transmissions do not affect destination nodes to receive packets.

To explain about the devices in an industrial environment, such devices can be divided into two categories: controllers and the controlled devices. Each device can be stationary or mobile. The scheduler must consider the mobility of the device because the location of a controlled device determines if the controlled device can directly communicate with the corresponding controller.

The transmission from a controller to a stationary machine or a mobile robot is called downlink transmission and the transmission from a stationary machine or a mobile robot to a controller is called uplink transmission. Downlink transmission is many-to-one transmission, i.e., a packet to a machine/robot can be transmitted by any controller within transmission range of the destination node. Uplink transmission is one-to-many transmission, i.e., a packet to a controller can be transmitted to any controller within transmission range of the source node.

Controllers cooperatively make TDMA transmission schedules for controllers and machines/robots. Controllers are synchronized. Therefore, controllers can simultaneously broadcast schedules to machines/robots via wireless communication link 160. Once a machine/robot receives the scheduling packet, it computes the time to start transmission and the time to complete transmission locally.

Packet Priority

To satisfy industrial system requirements, the priority can be assigned to data packet so that a higher priority packet is scheduled before a lower priority packet.

There are different ways to assign priority to a control packet. The control packet priority can be determined based on followings factors:

Factors Determining Control Packet Priority can Include:
  a. The first factor ($1^{st}$ factor) includes control data with urgent deadline.
  b. The second factor ($2^{nd}$ factor) includes a control packet that has not been acknowledged by destination, i.e., downlink retransmission.
  c. The third factor ($3^{rd}$ factor) includes an importance of the control packet, e.g., a machine cutter control packet is more important than an air conditioner control packet.
  d. The fourth factor ($4^{th}$ factor) includes an importance of the destination node, e.g., a machine cutter is more important than an air conditioner.
  e. The fifth factor ($5^{th}$ factor) includes other factors.

There are also different ways to assign priority to uplink packet. The uplink packet priority can be determined based on following factors:

Factors Determining Uplink Packet Priority can Include:
  a. The first factor ($1^{st}$ factor) includes a packet that has urgent deadline;
  b. The second factor ($2^{rd}$ factor) includes an uplink packet that was not successfully received, i.e., uplink retransmission;
  c. The third factor ($3^{rd}$ factor) an importance of the source machine/robot, e.g., a security monitor is more important than a room temperature sensor; and
  d. The fourth factor ($4^{th}$ factor) includes other factors.

To make efficient the schedules, multiple nodes (controllers, stationary machines and mobile robots) can be scheduled to transmit packets concurrently (simultaneously) at a time slot.

Optimal Concurrent Transmission Scheduling

By the embodiments of the invention, all controllers are scheduled to concurrently (simultaneously) transmit downlink broadcast/multicast packet at a time slot.

A controller C can transmit downlink unicast packet to multiple machines/robots that are within its transmission range. This group of machines/robots is called downlink neighborhood of C and denoted as $N^D_C$. In FIG. 1B, controller A has downlink neighborhood $N^D_A=\{$Machine A-1, Machine B-1, mobile robot M-1$\}$. Similarly, a machine/robot M can also transmit packet to any controller that is within its transmission range. This group of controllers is called uplink neighborhood of M and denoted as $N^U_M$. In FIG. 1B, Machine B-1 has uplink neighborhood $N^U_{B-1}=\{$Controller A, Controller B$\}$. The objective is to schedule optimal numbers of nodes to transmit packets concurrently at a time slot.

For example, concurrent transmission conditions include:
  a. The first condition includes: two controllers $C_i$ and $C_j$ that can transmit downlink packets concurrently if and only if:

$$C_i \text{ has a packet } P_i \text{ for } M_i \in N^D_{Ci} \text{ and } C_j \text{ has a packet } P_j \text{ for } M_j \in N^D_{Cj} \text{ such that at least one of } M_i \text{ or } M_j \notin N^D_{Ci} \cap N^D_{Cj} \quad (1)$$

If two of controllers $C_i$ and $C_j$ satisfy the condition (1), then $C_i$ and $C_j$ are said to be concurrent.

b. The second condition includes: two machines/robots $M_i$ and $M_j$ can concurrently transmit uplink packets if and only if their uplink neighborhoods $N^U_{Mi}$ and $N^U_{Mj}$ satisfy following condition:

$$N^U_{Mi} \cup N^U_{Mj} \neq N^U_{Mi} \cap N^U_{Mj} \quad (2)$$

If two machines/robots $M_i$ and $M_j$ satisfy the condition (2), then $M_i$ and $M_j$ are said to be concurrent.

c. The third condition includes: a machine/robot M and a controller C can concurrently transmit packets if and only if $$\exists M_C \in N^D_C \text{ such that } M_C \text{ is not neighbor of } M \text{ and}$$
$$\exists C_M \in N^U_M \text{ such that } C_M \text{ is not neighbor of } C \quad (3)$$

If machine/robot M and controller C satisfy the condition (3), then M and C are said to be concurrent.

Figure 3A:
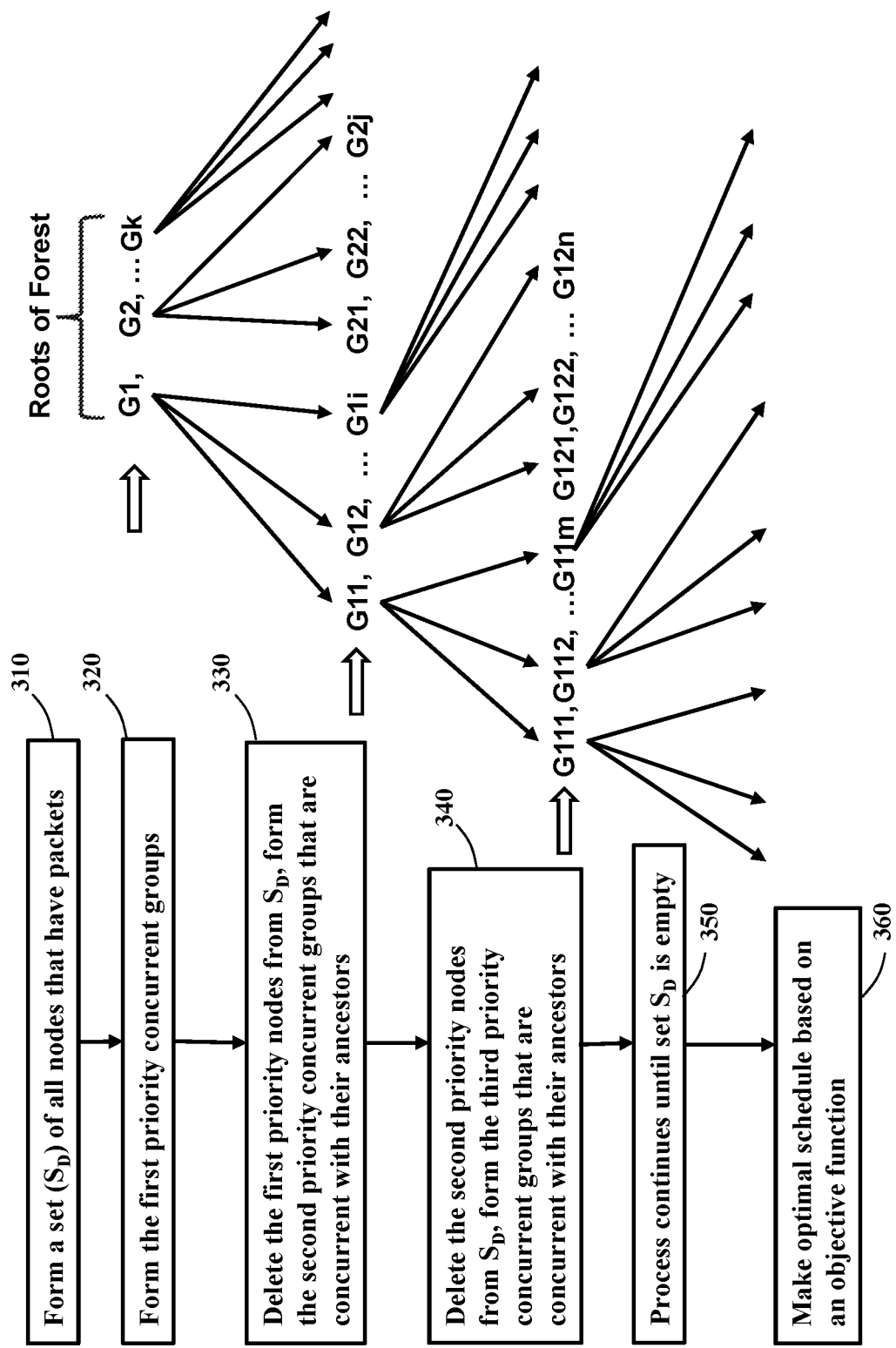
FIG. 3A is a flow diagram illustrating a priority based optimal scheduling using forest topology, according to embodiments of the present disclosure.

FIG. 3A is a flow diagram illustrating a priority based optimal scheduling using forest topology, according to embodiments of the present disclosure. In particular, FIG. 3A illustrates the process to make an optimal schedule. The process starts 310 to form a set of all nodes that have data to transmit and denote the set as $S_D$.

From set $S_D$, 320 form the first priority concurrent groups G1, G2, . . . , Gk, which are roots of forest topology, as follows:
  1. Let $N_1, N_2, \ldots, N_T$ be the nodes in set $S_D$ with the first priority packets.
  2. Form single node concurrent groups: since $N_i$ (i=1, 2, . . . , T) forms a concurrent group, there are T first priority concurrent groups.
  3. Form two node concurrent groups: there are total $C_T^2$ possible two node groups. Using conditions (1) or (2) or (3) to check if a two node group is concurrent. Notice that the total number of two node concurrent groups depends on the packet selection. The maximum number of two node concurrent groups are formed as follows:
Let $D_1, D_2, \ldots, DT$ be the first priority data sets for nodes $N_1, N_2, \ldots, N_T$, respectively.

For two node-packet pairs $\{N_i, P_{Ni}\}$ and $\{N_j, P_{Nj}\}$, define a concurrent function $CF(\{N_i, P_{Ni}\}, \{N_j, P_{Nj}\})$ as $$CF(\{N_i, P_{Ni}\}\{N_j, P_{Nj}\}) = \begin{cases} 1, & \text{if } N_i \text{ and } N_j \text{ are concurrent} \\ & \text{w.r.t } P_{Ni} \text{ and } P_{Nj} \\ 0, & \text{if } N_i \text{ and } N_j \text{ are not concurrent} \\ & \text{w.r.t } P_{Ni} \text{ and } P_{Nj} \end{cases}$$

For packets $P_{N1} \in D_1, P_{N2} \in D_2, \ldots, P_{NT} \in D_T$, number of concurrent groups (NCG) is given by $$NCG(P_{N1}, P_{N2}, \ldots, P_{NT}) = \sum_{i=1}^{T} \sum_{j=i+1}^{T} CF(\{N_i, P_{Ni}\}\{N_j, P_{Nj}\})$$

The maximum number of two node concurrent groups is given by packets $P^*_{N1} \in D_1, P^*_{N2} \in D_2, \ldots, P^*_{NT} \in D_T$ such that $$NCG(P^*_{N1}, P^*_{N2}, \ldots, P^*_{NT}) = \max_{P_{N1} \in D_1, P_{N2} \in D_2, \ldots, P_{NT} \in D_T} NCG(P_{N1}, P_{N2}, \ldots, P_{NT})$$

4. Form triple node concurrent groups: there are total $C_T^3$ possible three node groups. Using conditions (1) or (2) or (3) to check if a three node group is concurrent. Again, the total number of three node concurrent groups depends on the packet selection. The maximum number of three node concurrent groups can be formed similarly as for two node case.
5. The process continues until to form T node concurrent group: check if $N_1, N_2, \ldots, N_T$ can transmit packets concurrently, if yes, they form a T node current group.

Once the first priority concurrent groups are formed, delete the first priority nodes from set $S_D$ and form the second priority concurrent groups, which are also concurrent with respect to their ancestors 330 as follows:
1. Form the second priority concurrent groups similarly as forming the first priority concurrent groups.
2. For each {second priority concurrent group, first priority concurrent group} pair, if any node in the second priority concurrent group is not concurrent to any node in the first priority concurrent group, delete the node from the second priority concurrent group.
3. Delete all empty second priority concurrent groups
4. For ancestor G1, corresponding second priority groups are denoted as G11, G12, . . . , G1i; for ancestor G2, corresponding second priority groups are denoted as G21, G12, . . . , G2j; this process continues until to ancestor Gk.

Once the second priority concurrent groups are formed, delete the second priority nodes from set $S_D$ and form the third priority concurrent groups, which are also concurrent with respect to their ancestors 340 as follows:
1. Form the third priority concurrent groups similarly as forming the first priority concurrent groups.
2. For each {third priority concurrent group, second priority concurrent group} pair, if any node in the third priority concurrent group is not concurrent to any node in the second priority concurrent group, delete the node from the third priority concurrent group.
3. Delete all empty third priority concurrent groups.
4. For each {third priority concurrent group, first priority concurrent group} pair, if any node in the third priority concurrent group is not concurrent to any node in the first priority concurrent group, delete the node from the third priority concurrent group.
5. Delete all empty third priority concurrent groups.
6. For ancestor G1 and G11, corresponding third priority groups are denoted as G111, G112, . . . , G11m; for ancestors G1 and G12, corresponding third priority groups are denoted as G121, G122, . . . , G12n; this process continues until to all third concurrent groups are processed.

This process continues until set $S_D$ becomes empty 350. Once $N_D$ is empty, a forest structure is built.

It is not necessary that a branch has a concurrent group present at each level of the priority. For example, for a first priority concurrent group, it is possible that all second priority concurrent groups are not concurrent; however, there are the third priority concurrent groups that are concurrent.

Figure 3B:
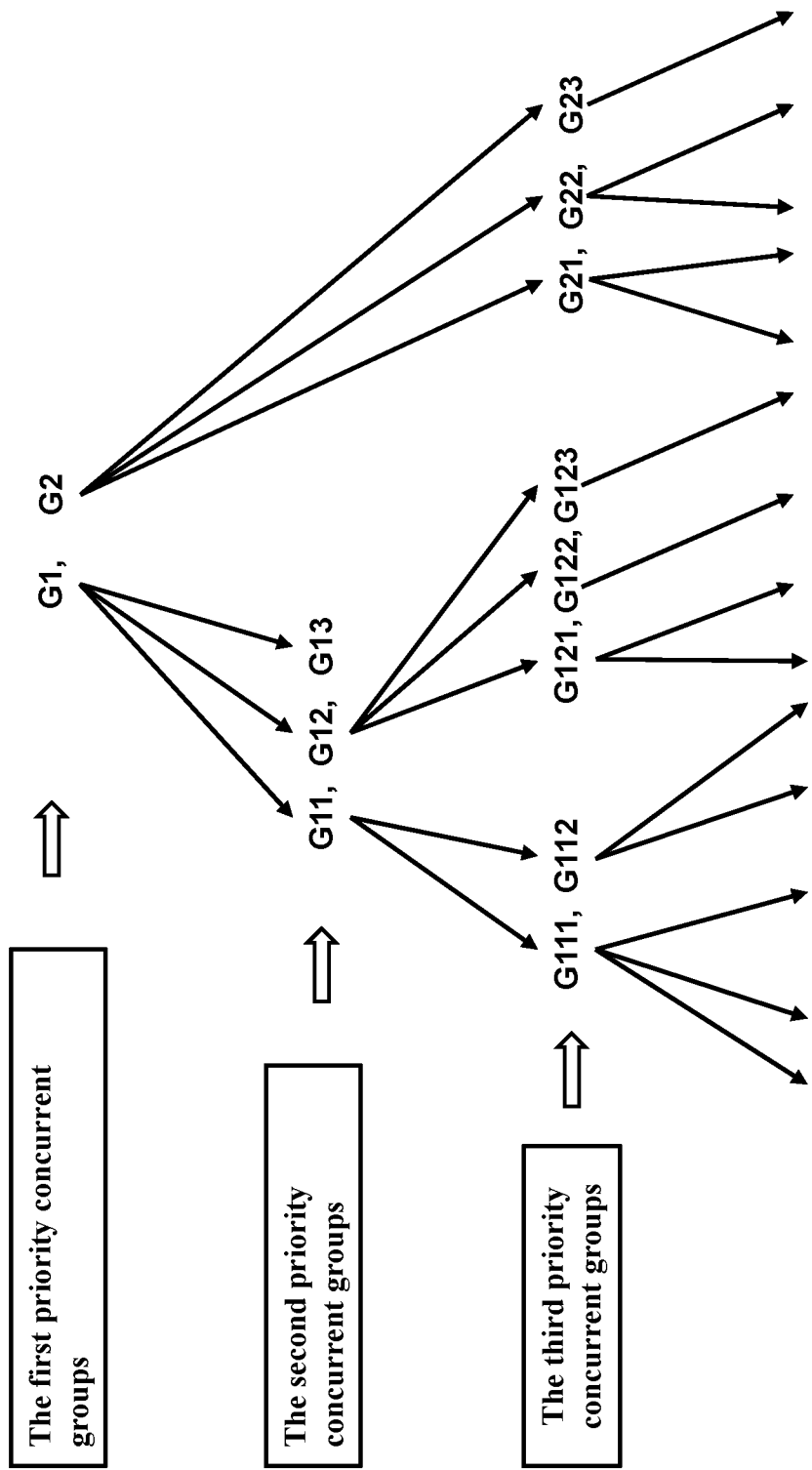
FIG. 3B is a flow diagram illustrating an example of forest topology with branches having different heights, according to embodiments of the present disclosure.

FIG. 3B is a flow diagram illustrating an example of forest topology with branches having different heights, according to embodiments of the present disclosure. Specifically, FIG. 3B shows an example, in which for the first priority concurrent group G2, there is no the second priority concurrent group. Therefore, different branches of the forest topology may have different heights.

All nodes on a branch can transmit packet concurrently. Using this forest structure, different optimal schedules can be made. Followings are some of the optimal scheduling methods:

First method includes (1) selecting a forest branch such that at each priority level, a concurrent group with the maximum number of nodes is selected. The objective function can be defined as $$F(B) = \sum_{i=1}^{H_B} g_i \qquad (4)$$

where B is a branch of forest, $H_B$ is the height of the branch B, $g_i$ (i=1, 2, . . . , $H_B$) is the size of concurrent group at the $i^{th}$ level of branch B. The optimal branch B* satisfies:

$$F(B^*) = \sum_{i=1}^{H_B} (g_i^* = \max\{g_i\}) \qquad (5)$$

Use size of descendant to break tie. If the size of descendant cannot break tie, then randomly select a concurrent group at the priority level.

The second method includes (2) selecting a forest branch that has the maximum total number of nodes. The objective function can be defined as $$F(B) = \sum_{i=1}^{H_B} g_i \qquad (6)$$

The optimal branch B* satisfies:

$$F(B^*) = \max_{B \in \{all\ braches\}} \sum_{i=1}^{H_B} g_i \qquad (7)$$

Use priority to break tie. If the priority cannot break tie, then randomly select a branch.

The third method includes (3) selecting a forest branch that the maximum total priority. Define an objective function as $$F(B) = \sum_{i=1}^{H_B} p_i g_i \qquad (8)$$

Where B is a branch of forest, $H_B$ is the height of the branch B, $p_i$ (i=1, 2, . . . , $H_B$) is the priority at the $i^{th}$ level of branch. The optimal branch B* satisfies:

$$F(B^*) = \max_{B \in \{all\ branche\}} F(B) \qquad (9)$$

Other objective functions can also be defined to make optimal schedules with respect to other constraints.

Time Slot Request and Cooperative Schedule Configuration

Machines/robots can send their time requests in two ways:
1. First, piggybacked in uplink data packet or in acknowledgement (ACK) packet; and/or
2. Second via a special time request packet.

If the time request is piggybacked in uplink data packet or ACK packet, the packet needs to be relayed by other controllers to the designated controller via reliable communication link 130 if the machine/robot cannot directly communicate with the designated controller through wireless link 160. For example, in FIG. 1B, the packet from machine A-2 to controller A needs to be relayed by controller B via reliable communication link 130. Once the designated controller obtains time request, the controller sends time request to a principal (master) controller via reliable communication link 130. If the time request is sent via a special time request packet, the packet can be sent to any controller within wireless communication range of the machine/robot. If principal (master) controller receives the time request packet, no relay is needed. If a non-principal (master) controller receives the time request packet, the packet is relayed to principal (master) controller via reliable communication link 130.

For periodic uplink data, a time request includes data priority, time to transmit data, data size, data type, data period, neighbor information, etc. For event driven uplink data, a time request includes data priority, time to transmit data, data size, data type, neighbor information, etc. A machine/robot piggybacks time request into uplink data packet or ACK packet if the scheduled time is long enough to do so. Otherwise, the scheduled time is not long enough or the machine/robot is not scheduled in current schedule. In this case, the machine/robot can send time request by one of following methods:
1. The first method ($1^{st}$ method) includes a proactive time request transmission: controllers proactively select unscheduled machine/robot to transmit time request at unused portion of time slot. The selection can be round robin or based on criteria such as importance of machine/robot, unscheduled time length, etc.
2. The second method ($2^{nd}$ method) includes a reactive time request transmission: a machine/robot knows schedule and its neighborhood. Therefore, the machine/robot can determine a time slot to transmit time request to a controller without causing the interference.
3. The third method ($3^{nd}$ method) includes a reactive-piggybacked time request transmission: a machine/robot can piggyback time request into its scheduled packet transmission.
4. The fourth method (4th method) includes a reactive-piggybacked-relay time request transmission: a machine/robot knows schedule and its neighborhood. Therefore, the machine/robot can determine a machine/robot neighbor and transmits time request to that neighbor without causing the interference. Upon receiving the time request, the neighbor piggybacks the received time request into its scheduled uplink packet and relays the time request to a controller.

Controllers cooperatively configure scheduling packet based on time requests from machines/robots and downlink control traffic from controllers. Each controller knows information about control data it needs to transmit to its controlled machines and/or robots. Controllers propagate schedule information to a designated principal (master) controller via reliable communication link 130.

Figure 4A:
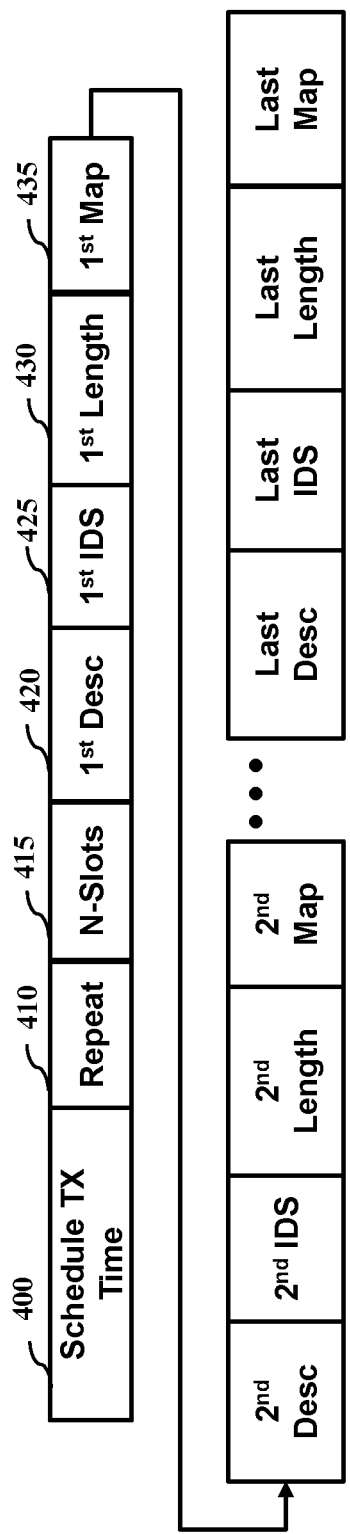
FIG. 4A is a block diagram illustrating a format of a schedule packet, according to embodiments of the present disclosure.

FIG. 4A is a block diagram illustrating a format of a schedule packet, according to embodiments of the present disclosure. Principal (Master) controller formulates a schedule in a schedule packet. For example, FIG. 4A shows format of the schedule packet, which consists of a Schedule TX Time field 400, a Repeat field 410, an N-Slots field 415, multiple Description field 420, multiple IDs fields 425, multiple Length fields 430 and multiple Map fields 435. Schedule TX Time field 400 specifies the time all controllers simultaneously transmit the schedule packet. The Repeat field 410 indicates the number of times this schedule repeats. This field is determined by considering downlink and/or uplink traffic requirements. The N-Slots field 415 indicates the number of time slots scheduled in this schedule. The Description field 420 explains the format of each time slot. The IDS field 425 specifies nodes (controllers, machines, robots) that are scheduled to transmit at a specified time slot. Nodes whose IDs are not present in IDS field are considered to be receiving nodes. The Length field 430 determines the length of a specified time slot. Different time slots may have different lengths. Summation of all length fields is total time of a schedule. The Map field 435 maps transmission nodes to receiving nodes at the specified time slot.

Figure 4B:
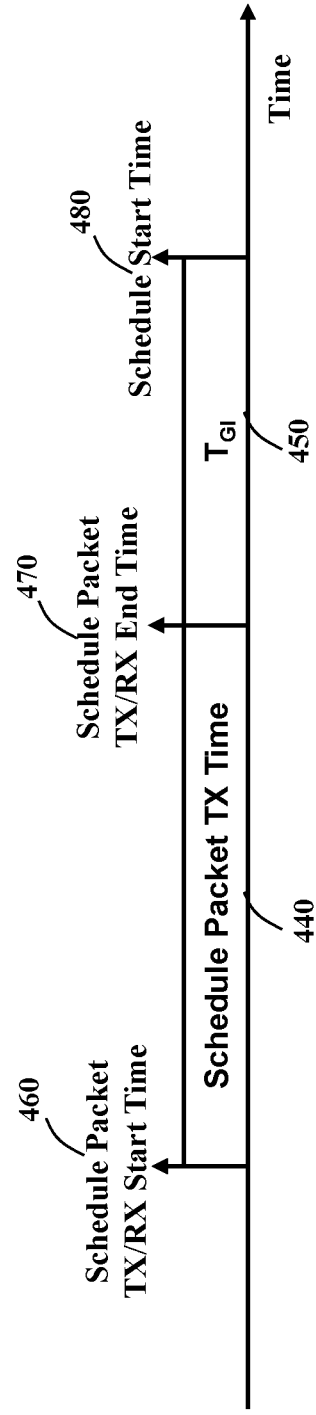
FIG. 4B is a block diagram illustrating a schedule start time calculation, according to embodiments of the present disclosure.

FIG. 4B is a block diagram illustrating a schedule start time calculation, according to embodiments of the present disclosure. As shown in FIG. 4B, the time gap from the schedule packet transmission starting time to the first time slot start time includes schedule packet transmission time 440 and a guard interval (TGI) 450. The guard interval $T_{GI}$ takes account of time needed for nodes to perform transmission to receiving (TX2RX) turnaround and/or receiving to transmission (RX2TX) turnaround. A controller records schedule packet transmission start time (SPTST) 460, schedule packet transmission end time (SPTET) 470 and calculates the schedule start time (SST) 480 as $$SST=SPTET-SPTST+|T_{GI}| \qquad (10)$$

A machine/robot records schedule packet receiving start time (SPRST) 460, schedule packet receiving end time (SPRET) 470 and calculates the schedule start time (SST) 480 as $$SST=SPRET-SPRST+|T_{GI}| \qquad (11)$$

Notice that SPRST and SPRET are recorded based on local clock of the machine/robot, which also calculates the schedule start time based on its local clock. Therefore, machine/robot does not need synchronization.

The length of a specific time slot is calculated as the time needed to transmit largest packet scheduled plus time to wait for acknowledgement (ACK) packet and the time to transmit ACK packet if the ACK packet is needed. By embodiments of the invention, uplink packet does not need ACK packet, but downlink packet may need ACK packet. Therefore, if a downlink packet $P_D$ and an uplink packet $P_U$ have same size, the $P_D$ requires more scheduled time than $P_U$ does.

The IDS field 425 and the Map field 435 can be used to support sleep operation. If a node's ID does not appear in both IDS field and Map field, the node can sleep in that time slot.

Principal (Master) controller propagates the schedule packet to all controllers via reliable communication link 130. All controllers simultaneously transmit the schedule packet to machines/robots at the time specified by Schedule TX Time field 400. Because controllers are synchronized, they can transmit the schedule packet at exact same time.

A node can transmit multiple packets within the schedule time, which may a portion of a time slot or a time slot.

Parallel Scheduling, Sequential Scheduling and Mixed Scheduling

By embodiments of the invention, a time slot can be scheduled in two ways: parallel scheduling and sequential scheduling.

With parallel scheduling, a time slot is scheduled to a group of nodes that that can transmit packets concurrently or in parallel.

Figure 5A:
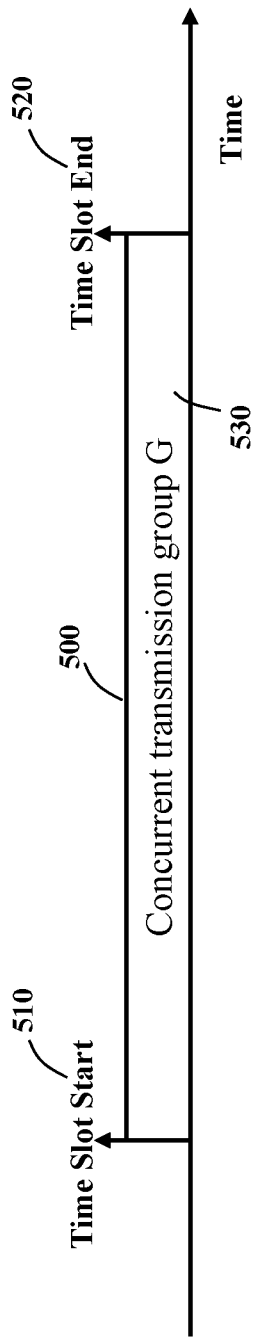
FIG. 5A is a block diagram illustrating an example of parallel scheduling, according to embodiments of the present disclosure.

FIG. 5A is a block diagram illustrating an example of parallel scheduling, according to embodiments of the present disclosure. Specifically, FIG. 5A shows an example of time slot 500 starting at time 510 and ending at time 520. The time slot 500 is scheduled to a concurrent transmission group G 530. With sequential scheduling, a time slot is sequentially scheduled to multiple nodes.

Figure 5B:
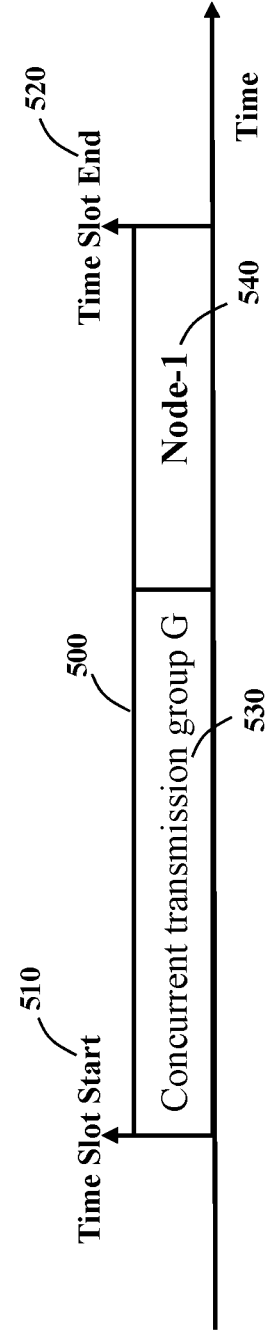
FIG. 5B is a block diagram of illustrating a format of the schedule packet, according to embodiments of the present disclosure.

FIG. 5B is a block diagram of illustrating an example of sequential scheduling, according to embodiments of the present disclosure. In particular, FIG. 5B shows an example of time slot 500 is sequentially scheduled to a concurrent transmission group G 530 and node-1 540.

Features

It is contemplated that the predetermined priority optimization assignment that determines the prioritized order of transmission for each transmission in each group for the set of transmissions, can be based on: evaluating priorities of the transmissions for each group of transmissions, such that each group of transmissions include transmissions having levels of priority that are either equal or different. Determine a sum of a number of different levels of priorities from the transmissions for each group of transmissions. Assign each group of transmissions of the groups of transmissions sequentially, according to a largest amount of number of different levels of priorities to a smallest amount of number of different levels of priorities in the groups of transmissions. By assigning the group of transmissions having the largest amount of number of different levels of priorities to the first time slot in the sequence of time slots, and ending the sequential assignment. As well as, by assigning the group of transmissions having the smallest amount of number of different levels of priorities to the last time slot in the sequence of time slots of the time period.

It is also possible that the predetermined priority optimization assignment that determines the prioritized order of transmission for each transmission in each group for the set of transmissions, can be based on: evaluating priorities of the transmissions for each group of transmissions, such that each group of transmissions include transmissions having levels of priority that are either equal or different. Determine a number of different levels of priority from the transmissions for each group of transmissions. Determine a total number of transmissions for each different level of priority of the transmissions for all the different levels, for each group of transmissions. Compare each total number of transmissions for each different level of priority of the transmissions for each group of transmissions, beginning with the first level of priority and ending with the ending level of priority of the groups of transmissions, to a corresponding total number of transmissions for the different levels of priority for the remaining groups of transmissions, to identify sequentially a highest level of priority based on a largest total number of transmissions, to an ending level of priority having a lowest total number of transmissions, for all the different levels of all the groups of transmissions. Assign each identified level of priority of transmissions for all the different levels of all the groups of transmissions sequentially, according to the highest level of priority having the largest total number of transmissions, to the ending level of priority having the lowest total number of transmissions. By assigning sequentially the highest level of priority of transmissions to the first time slot, and ending the assignment, and by assigning the ending level of priority of transmissions to the last time slot, in the sequence of time slots for the time period.

Further still, the set of transmissions includes at least one downlink transmission, the down transmission is a transmission from a controller of the set of controllers to at least one destination device of the plurality of devices, such that the at least one destination device is a stationary machine or a mobile robot. Wherein a first priority of the downlink transmission is determined based on a priority urgent deadline of the downlink transmission. Wherein a second priority of the downlink transmission is determined based on a non-acknowledged transmission from the at least one destination device. Such that a downlink retransmission is initiated dependent upon one or a combination of a level of priority of the transmitting at least one controller, a level priority of the at least one destination device or other application specific factors.

It is possible the set of transmissions may include at least one uplink transmission, the uplink transmission is a transmission from at least one device of the plurality of devices to at least one destination controller of the set of controllers. Wherein a first priority of the uplink transmission is determined based on a priority urgent deadline of the uplink transmission. A second priority of the uplink transmission is determined based on a non-acknowledged transmission from the at least one destination controller, such that an uplink retransmission is initiated dependent upon one or a combination of a level of priority of the at least one destination controller or other application specific factors.

Further, that each controller of the set of controllers can determine a downlink neighborhood $N^D_C$, wherein the downlink neighborhood includes at least some devices of the plurality of devices within a transmission range of the controller C. Wherein the set of transmissions includes at least one downlink transmission. The downlink transmission is a transmission from at least one controller of the set of controllers to at least one destination device of the plurality of devices. Such that the downlink transmission is configured to be transmitted by any controller in the uplink neighborhood within a transmission range of the at least one destination device. Wherein at least one controller of the set of controllers is configured to transmit the downlink transmission to any destination device of the plurality of devices in the downlink neighborhood within a transmission range of the at least one controller.

It is possible that at least one device M of the plurality of devices is within a transmission range of at least one controller of the set of controllers, which results in a non-empty uplink neighborhood $N^U_M$ for the device. Wherein the uplink transmission is a transmission from at least one device of the plurality of devices to the at least one destination controller of the set of controllers. Wherein the uplink transmission is configured to be transmitted to any controller in the uplink neighborhood within the transmission range of the transmitting device.

Moreover, that each transmission in each level of priority sub-group can be determined if the transmission can transmit concurrently without interfering within the time slot in the time period with other transmissions within the level priority sub-group, based on: a first controller $C_i$ and a second controller $C_j$ concurrently transmit downlink transmissions, only if, the first controller $C_i$ has a transmission $P_i$ for a first device $M_i \in N^D_{C_i}$, and the second controller $C_j$ has a transmission $P_j$ for a second device $M_j \in N^D_{Cj}$, such that at least one of the first device $M_i$ or the second device have different downlink neighborhoods $M_j \notin N^D_{Ci} \cap N^D_{Cj}$. Wherein the first device $M_i$ transmits to a first uplink neighborhood $N^U_{Mi}$ within a transmission range of the transmitting first device. The second device $M_j$ transmits to a second uplink neighborhood $N^U_{Mj}$ within a transmission range of the transmitting second device, such that the first and the second device concurrently make uplink transmissions, only if, their respective uplink neighborhoods $N^U_{Mi}$ and $N^U_{Mj}$ are different $N^U_{Mi} \cup N^U_{Mj} \neq N^U_{Mi} \cap N^U_{Mj}$. Wherein a third controller C and a third device M can concurrently transmit transmissions, only if, the third controller has a downlink neighbor that is not a neighbor of the third device, and the third device has an uplink neighbor that is not a neighbor of the third controller.

Also, that the received levels of priorities for each transmission in the set of transmissions may be determined into groups of transmissions, based on: at least one device of the at least some of the devices, determines a level of priority for generated uplink transmissions and an updated network topology for the time period. Request a time slot within the period of time for each generated uplink transmission, based on: a proactive time slot request from the principal controller. Wherein the principal controller proactively selects some devices from the plurality of devices, to transmit time slot requests from some devices. Or, a reactive time slot request by the at least one device, wherein the at least one device determines a time slot within the period of time, only if, the time slot request can transmit to a controller without causing the interference. Or, upon receiving the transmission schedule by the at least one device, a reactive-piggybacked time slot request is attached into an uplink transmission of the at least one device, and sends the reactive-piggybacked uplink transmission to a controller at a time slot scheduled by the principal controller according to the transmission schedule.

Further still, that the received levels of priorities for each transmission in the set of transmissions can be determined into groups of transmissions, based on: upon receiving the transmission schedule by the at least one controller of the at least some of the controllers, the at least one controller determines a level of priority for generated downlink transmissions and an updated network topology for the time period. Propagate the received time slot requests from some of the devices within a transmission range of the at least one controller. Propagate time slot requests to the principal controller from the at least one controller via a reliable communication link, wherein each time slot request includes the determined priority of the transmission.

It is possible that the principal controller constructs a maximum forest structure that includes branches and roots, based on the determined priorities of transmissions and the topology of the network, such that each branch of the forest structure is one group of transmissions from the groups of transmissions. Wherein each branch is connected to a root within the forest structure. Such that the branches are sequentially arranged from a lowest level branch height to a highest level branch height. Where the first level of priority group is located at the lowest level branch height, and sequentially decreasing in level of priority, by stopping at the ending level of priority group located at the highest level branch height.

Further, upon receiving the transmission schedule from the principle controller by all controllers of the set of controllers, transmitters for all the controllers can be configured to simultaneously broadcast the transmission schedule to all the devices of the plurality of devices only at a time specified by the principal controller. Further still, that upon receiving the transmission schedule from the principle controller by all controllers of the set of controllers, each controller determines a starting time and an ending time for transmission for each time slot in the sequence of time slots. Wherein each controller records a schedule transmission starting time (STST) and a schedule transmission ending time (STET), such that the controller computes the schedule start time (SST) as $SST=STET-STST+|T_{GI}|$. Wherein at least one device within a transmission range of the controller, records the schedule receiving start time (SRST) and the schedule receiving end time (SRET), and computes the schedule start time (SST) as $SST=SRET-SRST+|T_{GI}|$, wherein $|T_{GI}|$ is the length of the guard interval.

Figure 6:
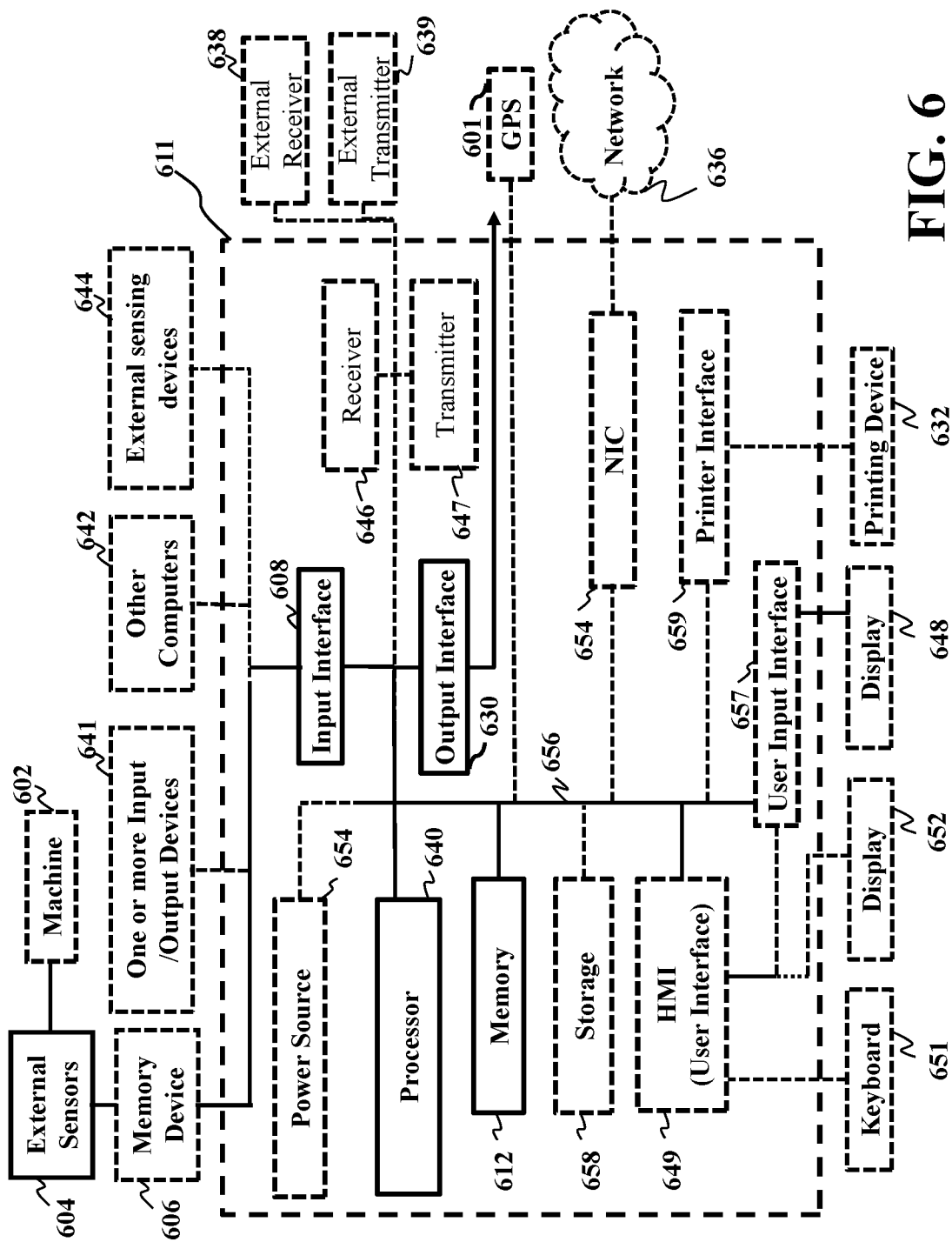
FIG. 6 is a block diagram of illustrating the method of FIG. 1A, that can be implemented using an alternate computer or processor, according to embodiments of the present disclosure.

FIG. 6 is a block diagram of illustrating the method of FIG. 1A, that can be implemented using an alternate controller, according to embodiments of the present disclosure. The controller 611 includes a processor 640, computer readable memory 612, storage 658 and user interface 649 with display 652 and keyboard 651, which are connected through bus 656. For example, the user interface 649 in communication with the processor 640 and the computer readable memory 612, acquires and stores the data in the computer readable memory 612 upon receiving an input from a surface, keyboard surface, of the user interface 657 by a user.

Contemplated is that the memory 612 can store instructions that are executable by the processor, historical data, and any data to that can be utilized by the methods and systems of the present disclosure. The processor 640 can be a single core processor, a multi-core processor, a computing cluster, or any number of other configurations. The processor 640 can be connected through a bus 656 to one or more input and output devices. The memory 612 can include random access memory (RAM), read only memory (ROM), flash memory, or any other suitable memory systems.

Still referring to FIG. 6, a storage device 658 can be adapted to store supplementary data and/or software modules used by the processor. For example, the storage device 658 can store historical data and other related data as mentioned above regarding the present disclosure. Additionally, or alternatively, the storage device 658 can store historical data similar to data as mentioned above regarding the present disclosure. The storage device 658 can include a hard drive, an optical drive, a thumb-drive, an array of drives, or any combinations thereof.

The system can be linked through the bus 656 optionally to a display interface (not shown) adapted to connect the system to a display device (not shown), wherein the display device can include a computer monitor, camera, television, projector, or mobile device, among others.

The controller 611 can include a power source 654, depending upon the application the power source 654 may be optionally located outside of the controller 611. Linked through bus 656 can be a user input interface 657 adapted to connect to a display device 648, wherein the display device 648 can include a computer monitor, camera, television, projector, or mobile device, among others. A printer interface 659 can also be connected through bus 656 and adapted to connect to a printing device 632, wherein the printing device 632 can include a liquid inkjet printer, solid ink printer, large-scale commercial printer, thermal printer, UV printer, or dye-sublimation printer, among others. A network interface controller (NIC) 634 is adapted to connect through the bus 656 to a network 636, wherein data or other data, among other things, can be rendered on a third party display device, third party imaging device, and/or third party printing device outside of the controller 611.

Still referring to FIG. 6, the data or other data, among other things, can be transmitted over a communication channel of the network 636, and/or stored within the storage system 658 for storage and/or further processing. Further, the data or other data may be received wirelessly or hard wired from a receiver 646 (or external receiver 638) or transmitted via a transmitter 647 (or external transmitter 639) wirelessly or hard wired, the receiver 646 and transmitter 647 are both connected through the bus 656. Further, a GPS 601 may be connected via bus 656 to the controller 611. The controller 611 may be connected via an input interface 608 to external sensing devices 644 and external input/output devices 641. The controller 611 may be connected to other external computers 642. An output interface 609 may be used to output the processed data from the processor 640.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A principal controller for determining a schedule of transmissions between wireless transceivers, wherein a receiver to receive information indicative of a set of transmissions between the wireless transceivers for a period of time, a priority of each transmission, and a topology of a network of wireless transceivers, the network defining neighborhood nodes for a time period, such that the neighborhood nodes includes a set of controllers and a plurality of devices, wherein each transmission is a unicast transmission, the principal controller comprising:
a processor to
sequentially partition, from the set of transmissions based on the priorities of transmissions and the topology of the network, groups of concurrent transmissions that do not interfere with each other, beginning with a highest priority group, and ending the sequential partition, with a lowest ending priority group, wherein, for each group, the processor applies a predetermined priority optimization assignment, and based on the priority optimizing, compares all transactions in all the groups according to the priority optimization assignment, to determine a prioritized order of transmission for each transmission in each group for the set of transmissions, by:
determine a number of different levels of priorities from the transmissions for each group of transmissions; and
assign each group of transmissions of the groups of transmissions sequentially, according to a largest number of different levels of priorities to a smallest number of different levels of priorities, by assigning the group of transmissions having the largest number of different levels of priorities to the first time slot in the sequence of time slots, and ending the sequential assignment, by assigning the group of transmissions having the smallest number of different levels of priorities to the last time slot in the sequence of time slots of the time period;
assign each transmission of the set of transmissions a respective time slot within a sequence of time slots of the time period according to the priority optimization assignment order of transmissions, to obtain the transmission schedule, starting with a highest transmission priority at a first time slot to lowest ending transmission priority at a last time slot in the sequence of time slots of the time period;
propagate the transmission schedule to controllers of the set of controllers; and
transmitters of the controllers then broadcast the transmission schedule to the network.

2. The principal controller of claim 1, wherein the predetermined priority optimization assignment determines the prioritized order of transmission for each transmission in each group for the set of transmissions, based on:
determine a number of transmissions for each group of transmissions; and
assign each group of transmissions of the groups of transmissions sequentially, according to a largest number of transmissions to a smallest number of transmissions, by assigning the group of transmissions having the largest number of transmissions to the first time slot in the sequence of time slots, and ending the sequential assignment, by assigning the group of transmissions having the smallest number of transmissions to the last time slot in the sequence of time slots of the time period.

3. The principal controller of claim 1, further comprising:
using a user input provided on a surface of at least one user input interface in communication with the processor, and received and stored in the memory by the processor, such that the user input relates to the predetermined priority optimization assignment.

4. The principal controller of claim 1, wherein the set of transmissions includes at least one downlink transmission, the at least one downlink transmission is a transmission from at least one controller of the set of controllers to at least one destination device of the plurality of devices, such that the at least one destination device is a stationary machine or a mobile robot, and wherein a first priority of the downlink transmission is determined based on a priority urgent deadline of the downlink transmission, and a second priority of the downlink transmission is determined based on a non-acknowledged transmission from the at least one destination device, such that a downlink retransmission is initiated dependent upon one or a combination of a level of priority of the transmitting at least one controller, a level priority of the at least one destination device or other application specific factors.

5. The principal controller of claim 1, wherein the set of transmissions includes at least one uplink transmission, the at least one uplink transmission is a transmission from at least one device of the plurality of devices to at least one destination controller of the set of controllers, wherein a first priority of the uplink transmission is determined based on a priority urgent deadline of the uplink transmission, and a second priority of the uplink transmission is determined based on a non-acknowledged transmission from the at least one destination controller, such that an uplink retransmission is initiated dependent upon one or a combination of a level of priority of the at least one destination controller or other application specific factors.

6. The principal controller of claim 1, wherein each controller of the set of controllers determines a downlink neighborhood $N^D_C$, wherein the downlink neighborhood includes at least some devices of the plurality of devices within a transmission range of the controller C.

7. The principal controller of claim 5, wherein the set of transmissions includes at least one downlink transmission, the at least one downlink transmission is a transmission from at least one controller of the set of controllers to at least one destination device of the plurality of devices, such that the downlink transmission is configured to be transmitted by any controller in the uplink neighborhood within a transmission range of the at least one destination device, and wherein at least one controller of the set of controllers is configured to transmit the downlink transmission to any destination device of the plurality of devices in the downlink neighborhood within a transmission range of the at least one controller.

8. The principal controller of claim 1, wherein at least one device M of the plurality of devices is within a transmission range of at least one controller of the set of controllers, which results in a non-empty uplink neighborhood $N^U_M$ for the at least one device, wherein the uplink transmission is a transmission from at least one device of the plurality of devices to the at least one destination controller of the set of controllers, and wherein the uplink transmission is configured to be transmitted to any controller in the uplink neighborhood within the transmission range of the transmitting at least one device.

9. The principal controller of claim 1, wherein each transmission in each level of priority sub-group is determined if the transmission can transmit concurrently without interfering within the time slot in the time period with other transmissions within the level priority sub-group, based on:
a first controller $C_i$ and a second controller $C_j$ concurrently transmit downlink transmissions, only if, the first controller $C_i$ has a transmission $P_i$ for a first device $M_i \in N^D_{Ci}$, and the second controller $C_j$ has a transmission $P_j$ for a second device $M_j \in N^D_{Cj}$, such that at least one of the first device $M_i$ or the second device have different downlink neighborhoods $M_j \notin N^D_{Ci} \cap N^D_{Cj}$,
wherein the first device $M_i$ transmits to a first uplink neighborhood $N^U_{Mi}$ within a transmission range of the transmitting first device, and the second device $M_j$ transmits to a second uplink neighborhood $N^U_{Mj}$ within a transmission range of the transmitting second device, such that the first and the second device concurrently make uplink transmissions, only if, their respective uplink neighborhoods $N^U_{Mi}$ and $N^U_{Mj}$ are different $N^U_{Mi} \cup N^U_{Mj} \neq N^U_{Mi} \cap N^U_{Mj}$,
wherein a third controller C and a third device M can concurrently transmit transmissions, only if, the third controller has a downlink neighbor that is not a neighbor of the third device, and the third device has an uplink neighbor that is not a neighbor of the third controller.

10. The principal controller of claim 1, wherein the received levels of priorities for each transmission in the set of transmissions is determined into groups of transmissions, based on:
at least one device of the at least some of the devices, determines a level of priority for generated uplink transmissions and an updated network topology for the time period, request a time slot within the period of time for each generated uplink transmission, based on:
a proactive time slot request from the principal controller, wherein the principal controller proactively selects some devices from the plurality of devices, to transmit time slot requests from some devices; or
a reactive time slot request by the at least one device, wherein the at least one device determines a time slot within the period of time, only if, the time slot request can transmit to a controller without causing the interference; or
upon receiving the transmission schedule by the at least one device, a reactive-piggybacked time slot request is attached into an uplink transmission of the at least one device, and sends the reactive-piggybacked uplink transmission to a controller at a time slot scheduled by the principal controller according to the transmission schedule.

11. The principal controller of claim 1, wherein the received levels of priorities for each transmission in the set of transmissions is determined into groups of transmissions, based on:
upon receiving the transmission schedule by the at least one controller of the at least some of the controllers, the at least one controller determines a level of priority for generated downlink transmissions and an updated network topology for the time period,
propagate the received time slot requests from some of the devices within a transmission range of the at least one controller, and
propagate time slot requests to the principal controller from the at least one controller via a reliable communication link, wherein each time slot request includes the determined priority of the transmission.

12. The principal controller of claim 1, wherein the principal controller constructs a maximum forest structure that includes branches and roots, based on the determined priorities of transmissions and the topology of the network, such that each branch of the forest structure is one group of transmissions from the groups of transmissions, and wherein each branch is connected to a root within the forest structure, such that the branches are sequentially arranged from a lowest level branch height to a highest level branch height, where the first level of priority group is located at the lowest level branch height, and sequentially decreasing in level of priority, by stopping at the ending level of priority group located at the highest level branch height.

13. The principal controller of claim 1, wherein upon receiving the transmission schedule from the principle controller by all controllers of the set of controllers, transmitters for all the controllers are configured to simultaneously broadcast the transmission schedule to all the devices of the plurality of devices only at a time specified by the principal controller.

14. The principal controller of claim 1, wherein upon receiving the transmission schedule from the principle controller by all controllers of the set of controllers, each controller determines a starting time and an ending time for transmission for each time slot in the sequence of time slots, wherein each controller records a schedule transmission starting time (STST) and a schedule transmission ending time (STET), such that the controller computes the schedule start time (SST) as $$SST = STET - STST + |T_{GI}|, \text{ and}$$

wherein at least one device within a transmission range of the controller, records the schedule receiving start time (SRST) and the schedule receiving end time (SRET), and computes the schedule start time (SST) as $$SST=SRET-SRST+|T_{GI}|,$$

wherein $|T_{GI}|$ is the length of the guard interval.

15. A principle controller for determining a schedule of transmissions between wireless transceivers, and including a receiver to receive information indicative of a set of transmissions between the wireless transceivers for a period of time, a priority of each transmission, and a topology of a network of wireless transceivers, the network defining neighborhood nodes for a time period, such that the neighborhood nodes include a set of controllers and a plurality of devices, wherein each transmission is a unicast transmission, the principle controller comprising:
   a memory;
   a processor in communication with the memory to
      sequentially partition, from the set of transmissions based on the priorities of transmissions and the topology of the network, groups of concurrent transmissions that do not interfere with each other, beginning with a highest priority group, and ending the sequential partition, with a lowest ending priority group, wherein, the processor applies a predetermined priority optimization assignment for each group, and based on the priority optimizing, compares all transactions in all the groups according to the priority optimization assignment, to determine a prioritized order of transmission for each transmission for the set of transmissions, by:
         determine a number of different levels of priorities from the transmissions for each group of transmissions; and
         assign each group of transmissions of the groups of transmissions sequentially, according to a largest number of different levels of priorities to a smallest number of different levels of priorities, by assigning the group of transmissions having the largest number of different levels of priorities to the first time slot in the sequence of time slots, and ending the sequential assignment, by assigning the group of transmissions having the smallest number of different levels of priorities to the last time slot in the sequence of time slots of the time period;
      assign each transmission of the set of transmissions a respective time slot within a sequence of time slots of the time period according to the priority optimization assignment order of transmissions, to obtain the transmission schedule, starting with a highest transmission priority at a first time slot to lowest ending transmission priority at a last time slot in the sequence of time slots of the time period;
      propagate the transmission schedule to controllers of the set of controllers; and
      transmitters of the controllers then broadcast the transmission schedule to the network.

16. The principal controller of claim 15, wherein the predetermined priority optimization assignment determines the prioritized order of transmission for each transmission in each group for the set of transmissions, based on:
   determine a number of transmissions for each group of transmissions; and
   assign each group of transmissions of the groups of transmissions sequentially, according to a largest number of transmissions to a smallest number of transmissions, by assigning the group of transmissions having the largest number of transmissions to the first time slot in the sequence of time slots, and ending the sequential assignment, by assigning the group of transmissions having the smallest number of transmissions to the last time slot in the sequence of time slots of the time period.

17. The principal controller of claim 15, wherein the predetermined priority optimization assignment determines the prioritized order of transmission for each transmission in each group for the set of transmissions, based on:
   evaluate priorities of the transmissions for each group of transmissions, such that each group of transmissions include transmissions having levels of priority that are either equal or different;
   determine a sum of a number of different levels of priorities from the transmissions for each group of transmissions; and
   assign each group of transmissions of the groups of transmissions sequentially, according to a largest amount of number of different levels of priorities to a smallest amount of number of different levels of priorities in the groups of transmissions, by assigning the group of transmissions having the largest amount of number of different levels of priorities to the first time slot in the sequence of time slots, and ending the sequential assignment, by assigning the group of transmissions having the smallest amount of number of different levels of priorities to the last time slot in the sequence of time slots of the time period.

18. A method for determining a schedule of transmissions between wireless transceivers, and including a principle controller in communication with the wireless transceivers, a receiver to receive information indicative of a set of transmissions between the wireless transceivers for a period of time, a priority of each transmission, and a topology of a network of wireless transceivers, the network defining neighborhood nodes for a time period, such that the neighborhood nodes include a set of controllers and a plurality of devices, wherein each transmission is a unicast transmission, the method comprising:
   sequentially partitioning, by a processor, from the set of transmissions based on the priorities of transmissions and the topology of the network, groups of concurrent transmissions that do not interfere with each other, beginning with a highest priority group, and ending the sequential partitioning, with a lowest ending priority group;
   applying, by the processor, to each group, a predetermined priority optimization assignment stored in a memory in communication with the processor, and based on the priority optimizing of each group, comparing all transactions in all the groups according to the priority optimization assignment, to determine a prioritized order of transmission for each transmission for the set of transmissions, by:
      determining a number of different levels of priorities from the transmissions for each group of transmissions; and
      assigning each group of transmissions of the groups of transmissions sequentially, according to a largest number of different levels of priorities to a smallest number of different levels of priorities, by assigning the group of transmissions having the largest number of different levels of priorities to the first time slot in the sequence of time slots, and ending the sequential assignment, by assigning the group of transmissions having the smallest number of different levels of priorities to the last time slot in the sequence of time slots of the time period;

assigning, by the processor, to each transmission in each group of the set of transmissions, a respective time slot within a sequence of time slots of the time period according to the priority optimization assignment order of transmissions, to obtain the transmission schedule, starting with a highest transmission priority at a first time slot to lowest ending transmission priority at a last time slot in the sequence of time slots of the time period;

propagating the transmission schedule to controllers of the set of controllers; and broadcasting the transmission schedule to the network using transmitters of the controllers.

19. A principal controller for determining a schedule of transmissions between wireless transceivers, wherein a receiver receives information indicative of, a set of transmissions between the wireless transceivers for a period of time, a priority of each transmission, and a topology of a network of wireless transceivers, the network defining neighborhood nodes for a time period, such that the neighborhood nodes includes a set of controllers and a plurality of devices, wherein each transmission is a unicast transmission, comprising:

a processor in communication with a computer readable memory to sequentially partition, from the set of transmissions based on the priorities of transmissions and the topology of the network, groups of concurrent transmissions that do not interfere with each other, beginning with a highest priority group, and ending the sequential partition, with a lowest ending priority group, wherein, for each group, the processor applies a predetermined priority optimization assignment, and based on the priority optimizing, compares all transactions in all the groups according to the priority optimization assignment, to determine a prioritized order of transmission for each transmission in each group for the set of transmissions, by:

evaluate priorities of the transmissions for each group of transmissions, such that each group of transmissions include transmissions having levels of priority that are either equal or different;

determine a sum of a number of different levels of priorities from the transmissions for each group of transmissions; and assign each group of transmissions of the groups of transmissions sequentially, according to a largest amount of number of different levels of priorities to a smallest amount of number of different levels of priorities in the groups of transmissions, by assigning the group of transmissions having the largest amount of number of different levels of priorities to the first time slot in the sequence of time slots, and ending the sequential assignment, by assigning the group of transmissions having the smallest amount of number of different levels of priorities to the last time slot in the sequence of time slots of the time period;

assign each transmission of the set of transmissions a respective time slot within a sequence of time slots of the time period according to the priority optimization assignment order of transmissions, to obtain the transmission schedule, starting with a highest transmission priority at a first time slot to lowest ending transmission priority at a last time slot in the sequence of time slots of the time period;

propagate the transmission schedule to controllers of the set of controllers; and transmitters of the controllers then broadcast the transmission schedule to the network.

20. A principal controller for determining a schedule of transmissions between wireless transceivers, wherein a receiver receives information indicative of, a set of transmissions between the wireless transceivers for a period of time, a priority of each transmission, and a topology of a network of wireless transceivers, the network defining neighborhood nodes for a time period, such that the neighborhood nodes includes a set of controllers and a plurality of devices, wherein each transmission is a unicast transmission, comprising:

a processor to sequentially partition, from the set of transmissions based on the priorities of transmissions and the topology of the network, groups of concurrent transmissions that do not interfere with each other, beginning with a highest priority group, and ending the sequential partition, with a lowest ending priority group, wherein, for each group, the processor applies a predetermined priority optimization assignment, and based on the priority optimizing, compares all transactions in all the groups according to the priority optimization assignment, to determine a prioritized order of transmission for each transmission in each group for the set of transmissions, by:

evaluate priorities of the transmissions for each group of transmissions, such that each group of transmissions include transmissions having levels of priority that are either equal or different;

determine a number of different levels of priority from the transmissions for each group of transmissions;

determine a total number of transmissions for each different level of priority of the transmissions for all the different levels, for each group of transmissions;

compare each total number of transmissions for each different level of priority of the transmissions for each group of transmissions, beginning with the first level of priority and ending with the ending level of priority of the groups of transmissions, to a corresponding total number of transmissions for the different levels of priority for the remaining groups of transmissions, to identify sequentially a highest level of priority based on a largest total number of transmissions, to an ending level of priority having a lowest total number of transmissions, for all the different levels of all the groups of transmissions; and assign each identified level of priority of transmissions for all the different levels of all the groups of transmissions sequentially, according to the highest level of priority having the largest total number of transmissions, to the ending level of priority having the lowest total number of transmissions, by assigning sequentially the highest level of priority of transmissions to the first time slot, and ending the assignment, by assigning the ending level of priority of transmissions to the last time slot, in the sequence of time slots for the time period;

assign each transmission of the set of transmissions a respective time slot within a sequence of time slots of the time period according to the priority optimization assignment order of transmissions, to obtain the transmission schedule, starting with a highest transmission priority at a first time slot to lowest ending transmission priority at a last time slot in the sequence of time slots of the time period;

propagate the transmission schedule to controllers of the set of controllers; and transmitters of the controllers then broadcast the transmission schedule to the network.

* * * * *